US012791314B2

(12) United States Patent
Park et al.

(10) Patent No.: US 12,791,314 B2
(45) Date of Patent: Nov. 10, 2026

(54) METHODS AND TECHNIQUES FOR PREDICTING AND CONSTRAINING KINEMATIC TRAJECTORIES

(71) Applicant: Unknot.id Inc., Winter Garden, FL (US)

(72) Inventors: Michael Park, Cresskill, NJ (US); Devu Manikantan Shila, Winter Garden, FL (US)

(73) Assignee: Unknot.id Inc., Orlando, FL (US)

( * ) Notice: Subject to any disclaimer, the term of this patent is extended or adjusted under 35 U.S.C. 154(b) by 232 days.

(21) Appl. No.: 18/203,643

(22) Filed: May 30, 2023

(65) Prior Publication Data

US 2023/0392930 A1 Dec. 7, 2023

Related U.S. Application Data

(60) Provisional application No. 63/346,954, filed on May 30, 2022.

(51) Int. Cl.
*G01C 21/00* (2006.01)
*G01S 5/02* (2010.01)

(52) U.S. Cl.
CPC .......... *G01C 21/005* (2013.01); *G01S 5/0294* (2013.01)

(58) Field of Classification Search
CPC ............................... G01S 21/206; G01S 19/47
See application file for complete search history.

(56) References Cited

U.S. PATENT DOCUMENTS 7,640,106 B1 * 12/2009 Stokar .................. G01C 21/166 702/92
10,037,028 B2 * 7/2018 Loianno ................... G08G 5/32
(Continued)

FOREIGN PATENT DOCUMENTS

CN 110691981 A * 1/2020 ......... G06K 7/10297

OTHER PUBLICATIONS

Jonathan Scholz, Martin Levihn, Charles L. Isbell, and David Wingate. 2014. A physics-based model prior for object-oriented MDPs. In Proceedings of the 31st International Conference on International Conference on Machine Learning—vol. 32 (ICML'14). JMLR.org, II-1089-11-1097. (Year: 2014).*
(Continued)

*Primary Examiner* — Hitesh Patel
*Assistant Examiner* — Tabitha Kress
(74) *Attorney, Agent, or Firm* — Quarles & Brady LLP

(57) ABSTRACT

Methods and systems provide for predicting and constraining kinematic trajectories of an object within an environment. In one embodiment, the system obtains sensor data from one or more sensor data streams; predicts, via an inertial tracking model, a trajectory of an object in an environment in a continuous fashion using the sensor data; retrieves environmental data consisting of a number of environmental constraints relating to the environment; generating, via a reinforcement learning (RL) agent, a number of corrections to the trajectory of the object based on the environmental constraints within the environmental data; and provides real-time tracking and navigation of the object in the environment based on the continuously predicted trajectory and the corrections to the predicted trajectory.

20 Claims, 7 Drawing Sheets

(56) References Cited

U.S. PATENT DOCUMENTS

| | | | | |
|---|---|---|---|---|
| 11,768,504 B2* | 9/2023 | Ebrahimi Afrouzi .. | G06N 3/082 701/25 |
| 12,049,010 B2* | 7/2024 | Tang | B25J 9/161 |
| 2016/0305745 A1* | 10/2016 | Peebles | F41G 3/04 |
| 2021/0156711 A1* | 5/2021 | Flade | G01C 25/00 |

OTHER PUBLICATIONS

Kollar, T. and Roy, N. (2006) 'Using reinforcement learning to improve exploration trajectories for error minimization', Proceedings 2006 IEEE International Conference on Robotics and Automation, 2006. ICRA 2006., pp. 3338-3343. (Year: 2006).*
Yunxiao, Y., Wangjun, Hualiang, Z., & Shilong, D. (2021). Path planning of mobile robot based on improved DDQN. Journal of Physics: Conference Series, 2024(1), 012029. doi:10.1088/1742-6596/2024/1/012029 (Year: 2021).*
Lin, Y., McPhee, J. and Azad, N.L. (2019) 'Longitudinal Dynamic versus Kinematic Models for Car-Following Control Using Deep Reinforcement Learning', Proceedings 2019 IEEE International Conference on Robotics and Automation, IEEE Intelligent Transportation Systems Conference (ITSC), 2019. (Year: 2019).*
Vasishta, P., Vaufreydaz, D., & Spalanzani, A. (Nov. 2018). Building prior knowledge: A Markov based pedestrian prediction model using urban environmental data. In 2018 15th International Conference on Control, Automation, Robotics and Vision (ICARCV) (pp. 247-253). IEEE. (Year: 2018).*
Foucher, S., Lalonde, M., & Gagnon, L. (Jun. 2011). A system for airport surveillance: detection of people running, abandoned objects, and pointing gestures. In Visual Information Processing XX (vol. 8056, pp. 281-288). SPIE. (Year: 2011).*
Duffin, E., Bland, A. R., Schaefer, A., & De Kamps, M. (2014). Differential effects of reward and punishment in decision making under uncertainty: a computational study. Frontiers in neuroscience, 8, 30. (Year: 2014).*
Vasquez, D., Fraichard, T., & Laugier, C. (2009). Growing hidden markov models: An incremental tool for learning and predicting human and vehicle motion. The International Journal of Robotics Research, 28(11-12), 1486-1506. (Year: 2009).*
B. Völz, H. Mielenz, G. Agamennoni and R. Siegwart, "Feature Relevance Estimation for Learning Pedestrian Behavior at Crosswalks," 2015 IEEE 18th International Conference on Intelligent Transportation Systems, Gran Canaria, Spain, 2015, pp. 854-860, doi: 10.1109/ITSC.2015.144. (Year: 2015).*
Ma, W. (2013). Agent-based model of passenger flows in airport terminals (Doctoral dissertation, Queensland University of Technology). (Year: 2013).*
Wang, M., Shi, D., Guan, N., Zhang, T., Wang, L., & Li, R. (Nov. 2019). Unsupervised pedestrian trajectory prediction with graph neural networks. In 2019 IEEE 31st International Conference on Tools with Artificial Intelligence (ICTAI) (pp. 832-839). IEEE. (Year: 2019).*
Bai, Shaojie, J Zico Kolter, and Vladlen Koltun. 2018. "An empirical evaluation of generic convolutional and recurrent networks for sequence modeling." arXiv preprint arXiv:1803.01271.
Chen, C.; Lu, C.X.; Markham, A.; Trigoni, N. IONet: Learning to Cure the Curse of Drift in Inertial Odometry. In Proceedings of the Thirty-Second AAAI Conference on Artificial Intelligence, Feb. 2018.
Clark et al., "VINet: Visual-Inertial Odometry as a Sequence-to-Sequence Learning Problem," in AAAI, 2017, pp. 3995-4001.
Cortes et al., "Deep Learning Based Speed Estimation for Constraining Strapdown Inertial Navigation on Smartphones," in arXiv, 2018.
Francis et al., Long-Range Indoor Navigation with PRM-L, IEEE Transactions on Robotics, vol. 36, No. 4, Aug. 2020.
Harle, "A Survey of Indoor Inertial Positioning Systems for Pedestrians," IEEE Communications Surveys and Tutorials, vol. 15, No. 3, pp. 1281-1293, 2013.
Herath et al., Fusion-DHL: WIFi, IMU, and Floorplan Fusion for Dense History of Locations in Indoor Environments, arXiv:2105.08837v1 [cs.RO] May 18, 2021.
Hu, Hao, Liqiang Wang, and Guo-Jun Qi. 2019. "Learning to Adaptively Scale Recurrent Neural Networks." AAAI Conference on Artificial Intelligence (AAAI).
Liu et al., "Cooperative relative positioning of mobile users by fusing IMU inertial and UWB ranging information," in ICRA 2017, 2017.
Lu, C.; Uchiyama, H.; Thomas, D.; Shimada, A.; Taniguchi, R.i. Indoor Positioning System Based on Chest-Mounted IMU. Sensors 2019, 19, 420.
Martins et al., ∞-former: Infinite Memory Transformer, arXiv:2109.00301v3 [cs.CL] Mar. 25, 2022.
Parker-Holder et al., Automated Reinforcement Learning (AutoRL): A Survey and Open Problems, Journal of Artificial Intelligence Research 74 (2022) 517-568.
Rae et al., Compressive Transformers for Long-Range Sequence Modelling, arXiv:1911.05507v1 [cs.LG] Nov. 13, 2019.
Rao et al., CTIN: Robust Contextual Transformer Network for Inertial Navigation, arXiv:1911.05507v1 [cs.LG] Nov. 13, 2019.
Shinde et.al, Learning Multiplicative Interactions with Bayesian Neural Networks for Visual-Inertial Odometry, AIAD, 2020.
Sun et al., IDOL: Inertial Deep Orientation-Estimation and Localization, arXiv:2102.04024v1 [cs.RO] Feb. 8, 2021.
Tzeng et al., Adversarial Discriminative Domain Adaptation, CVPR, 2017.
Van Hasselt et al., Deep Reinforcement Learning with Double Q-learning, Proceedings of the Thirtieth AAAI Conference on Artificial Intelligence (2016).
Vaswani, Attention Is All You Need, https://papers.nips.cc/paper/7181-attention-is-all-you-need.pdf, 2017.
Wagstaff et al., "LSTM-Based Zero-Velocity Detection for Robust Inertial Navigation," in IPIN, No. Sep. 2018, pp. 24-2.
Wang et al., "DeepVO : Towards End to-End Visual Odometry with Deep Recurrent Convolutional Neural Networks," in ICRA, 2017.
Xiao et al., "Robust pedestrian dead reckoning (R-PDR ) for arbitrary mobile device placement," in IPIN, 2014.
Xiao et al., Indoor Tracking Using Undirected Graphical Models, IEEE Transactions on Mobile Computing, vol. 14, No. 11, Nov. 2015.
Yan et al., RoNIN: Robust Neural Inertial Navigation in the Wild: Benchmark, Evaluations, and New Methods, arXiv:1905.12853v1 [cs.CV] May 30, 2019.
David Titterton, John L. Weston, John Weston, (2004) Strapdown Inertial Navigation Technology, Strapdown Inertial Navigation Technology—David Titterton, John L. Weston, John Weston—Google Books.

* cited by examiner

METHODS AND TECHNIQUES FOR PREDICTING AND CONSTRAINING KINEMATIC TRAJECTORIES

FIELD OF INVENTION

Various embodiments relate generally to location tracking and monitoring, and more particularly, to systems and methods for predicting and constraining kinematic trajectories of objects in environments.

SUMMARY

The appended claims may serve as a summary of this application.

BRIEF DESCRIPTION OF THE DRAWINGS

The present invention relates generally to digital communication, and more particularly, to systems and methods providing for predicting the projection points of overhead objects.

The present disclosure will become better understood from the detailed description and the drawings, wherein.

DETAILED DESCRIPTION

Figure 1:
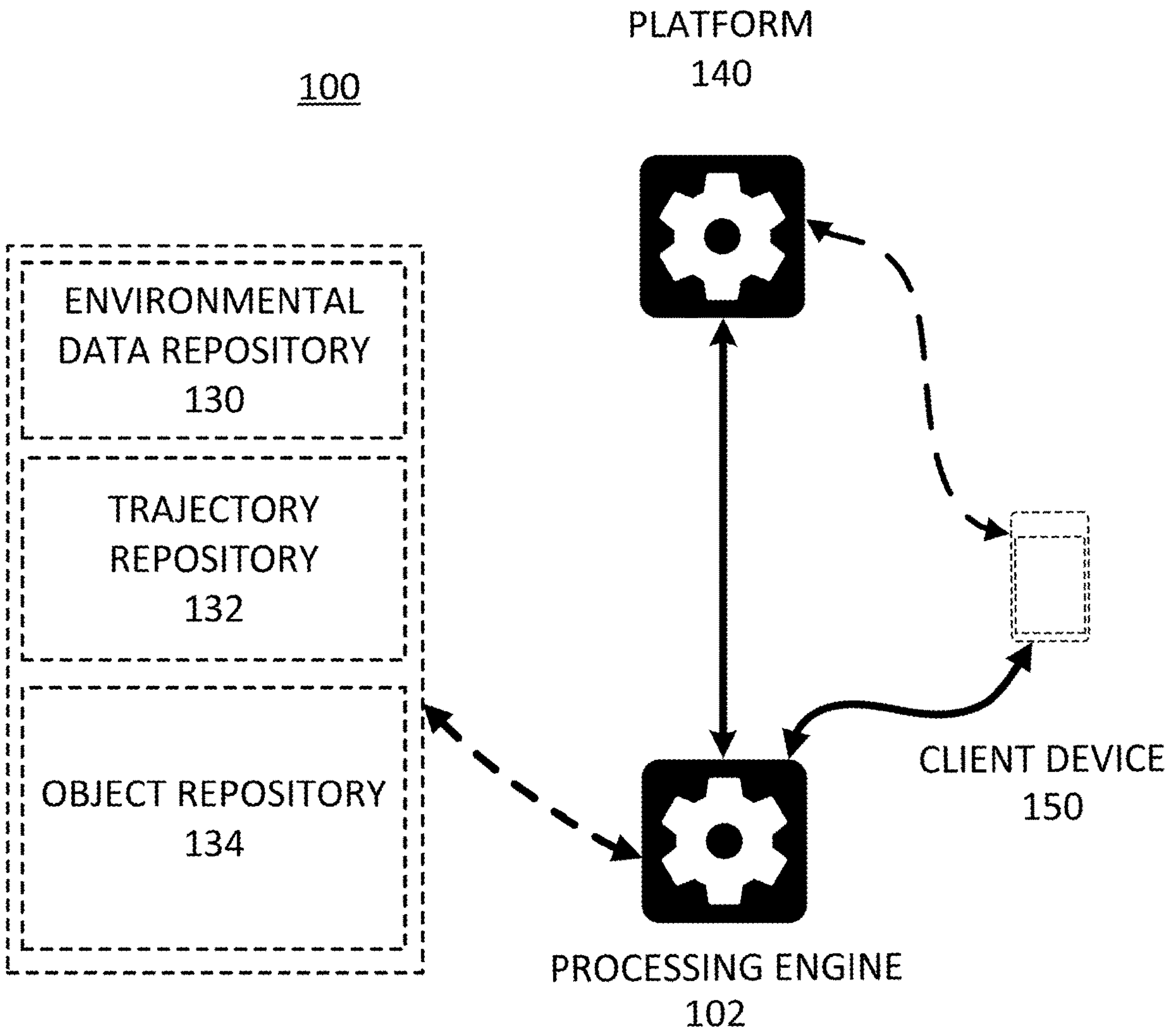
FIG. 1 is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Within the area of indoor location tracking and mapping, indoor localization using low-consumption Internet of Things (hereinafter "IoT") sensors presents a significant challenge in achieving high-precision results with practical algorithmic solutions. Current approaches rely on optimization models that incorporate imperfect trajectories generated by sensors, such as inertial motion units (hereinafter "IIMUs") found in modern smartphones, such as, e.g., accelerometers and gyroscopes. These trajectories are often combined with data from other available sensors and corrected using environmental constraints, such as floor maps and sparse ground truth points obtained from hardware devices, such as, e.g., wireless access points and Bluetooth beacons. Notably, dynamic programming methods and machine learning (hereinafter "ML")-based solutions have emerged as the most promising techniques for optimizing these constraints.

The primary technical challenge in this field arises from the cumulative effect of sequential errors in previous trajectory segments, which significantly impact the space of future possible states. Small errors in early orientation measurements can quickly lead to substantial differences in future positions, resulting in an exponential divergence of the number of states that must be considered for the optimization problem. These states are summed in the denominator of the likelihood function, which poses a computational challenge.

Dynamic programming solutions address the problem of state explosion by sacrificing long-term correlations, thereby simplifying the state space and making it tractable for optimization. The partition function, represented in the denominator of the likelihood function, aids in efficiently optimizing this likelihood function using techniques like Viterbi decoding. Dynamic programming methods offer the advantage of operating in a completely unsupervised manner and delivering real-time inference due to their computational efficiency. However, their reliance on ignoring long-term correlations makes them susceptible to accumulated drift. Practical implementations often rely heavily on magnetometer measurements, which can introduce large anomalies in real-world scenarios.

On the other hand, ML-based solutions tackle the problem of state explosion by leveraging computer vision to simplify the state space based on environmental features represented as images. These solutions perform a global fit to the trajectory using known constraints, resulting in highly accurate localization results. However, the need for a global fit limits their applicability to real-time tracking, and they typically require a significant number of ground truth points obtained from expensive electromagnetic beacons to mitigate the effects of drift.

Therefore, there is a need for an improved method that overcomes the limitations of existing approaches by predicting and constraining kinematic trajectories in an environment using, in various embodiments, sensor data, environmental constraints, and reinforcement learning techniques. By combining these elements, the proposed systems and methods aim to provide a robust and practical solution for high-precision indoor localization while offering real-time tracking capabilities and adaptability to dynamic environments.

In one embodiment, the system obtains sensor data from one or more sensor data streams; predicts, via an inertial tracking model, a trajectory of an object in an environment in a continuous fashion using the sensor data; retrieves environmental data consisting of a number of environmental constraints relating to the environment; generating, via a reinforcement learning (hereinafter "RL") agent, a number of corrections to the trajectory of the object based on the environmental constraints within the environmental data; and provides real-time tracking and navigation of the object in the environment based on the continuously predicted trajectory and the corrections to the predicted trajectory.

In some embodiments, the system obtains multi-modal sensing data available from sensors such as IMUs (encompassing tri-axial accelerometer and gyroscope), magnetometer, cameras, audio capture devices, and barometers to continuously predict object 3D position and orientation in any contested or challenging environment.

In various embodiments, the sensor data streams may encompass a variety of data sources that capture different aspects of the object's motion and environment. For example, the method may utilize data from one or more of the following sensors: tri-axial accelerometer, gyroscope, magnetometer, camera, audio, or barometer. In some embodiments, a tri-axial accelerometer measures the object's acceleration in three orthogonal directions, providing information about its linear motion. By analyzing the changes in acceleration over time, the system can estimate the object's velocity and position. In some embodiments, a gyroscope measures the object's angular velocity around three axes, enabling the method to track its rotational movements. By integrating the angular velocity values, the system can estimate the object's orientation and angular position. In some embodiments, a magnetometer measures the strength and direction of the ambient magnetic field, aiding in the determination of the object's heading or orientation with respect to magnetic north. This data may be particularly useful in scenarios where GPS signals are weak or unavailable. In some embodiments, one or more cameras capture visual information about the environment, allowing the method to extract features and landmarks for localization and mapping purposes. In some embodiments, computer vision techniques can be employed to analyze the camera data, enabling the method to, for example, detect and track objects, recognize environmental constraints, or perform map-matching to enhance the accuracy of the trajectory predictions. In some embodiments, audio data, captured by, e.g., microphones or other audio sensors, can provide additional contextual information about the environment. Sound-based localization or audio-based object recognition techniques can be employed to improve the tracking and navigation capabilities of the method. In some embodiments, barometer data, which measures atmospheric pressure, can be utilized to estimate changes in altitude or elevation. This data may be used for vertical tracking and navigation, such as determining the object's position on different floors or levels within a multi-story building.

In some embodiments, the systems and methods herein can be used for precise tracking of any object such as, e.g., personnel, ground vehicle, flying cars, weapons, or any devices fitted with one or mobile sensors (e.g., IMU, magnetometer, camera, audio, or barometer). The technology herein eliminates the need for instrumenting infrastructures with cameras, or any networking devices, as it relies on the sensors fitted to the personnel or the device.

In some embodiments, the predicted trajectory is fused with the floor map and any environmental ground truth points to correct the predictions and track the object of interest accurately.

Further areas of applicability of the present disclosure will become apparent from the remainder of the detailed description, the claims, and the drawings. The detailed description and specific examples are intended for illustration only and are not intended to limit the scope of the disclosure.

FIG. 1 is a diagram illustrating an exemplary environment in which some embodiments may operate. In the exemplary environment 100, a client device 150 is connected to a processing engine 102 and a platform 140. The processing engine 102 is connected to the platform 140, and optionally connected to one or more repositories and/or databases, including, e.g., an environmental data repository 130, a trajectory repository 132, and an object repository 134. One or more of the databases may be combined or split into multiple databases. The client device 150 in this environment may be a computer, and the platform 140 and processing engine 102 may be applications or software hosted on a computer or multiple computers which are communicatively coupled via remote server or locally.

The exemplary environment 100 is illustrated with only one client device, one processing engine, and one platform, though in practice there may be more or fewer additional client devices, processing engines, and/or platforms. In some embodiments, the client device(s), processing engine, and/or platform may be part of the same computer or device.

Figure 2:
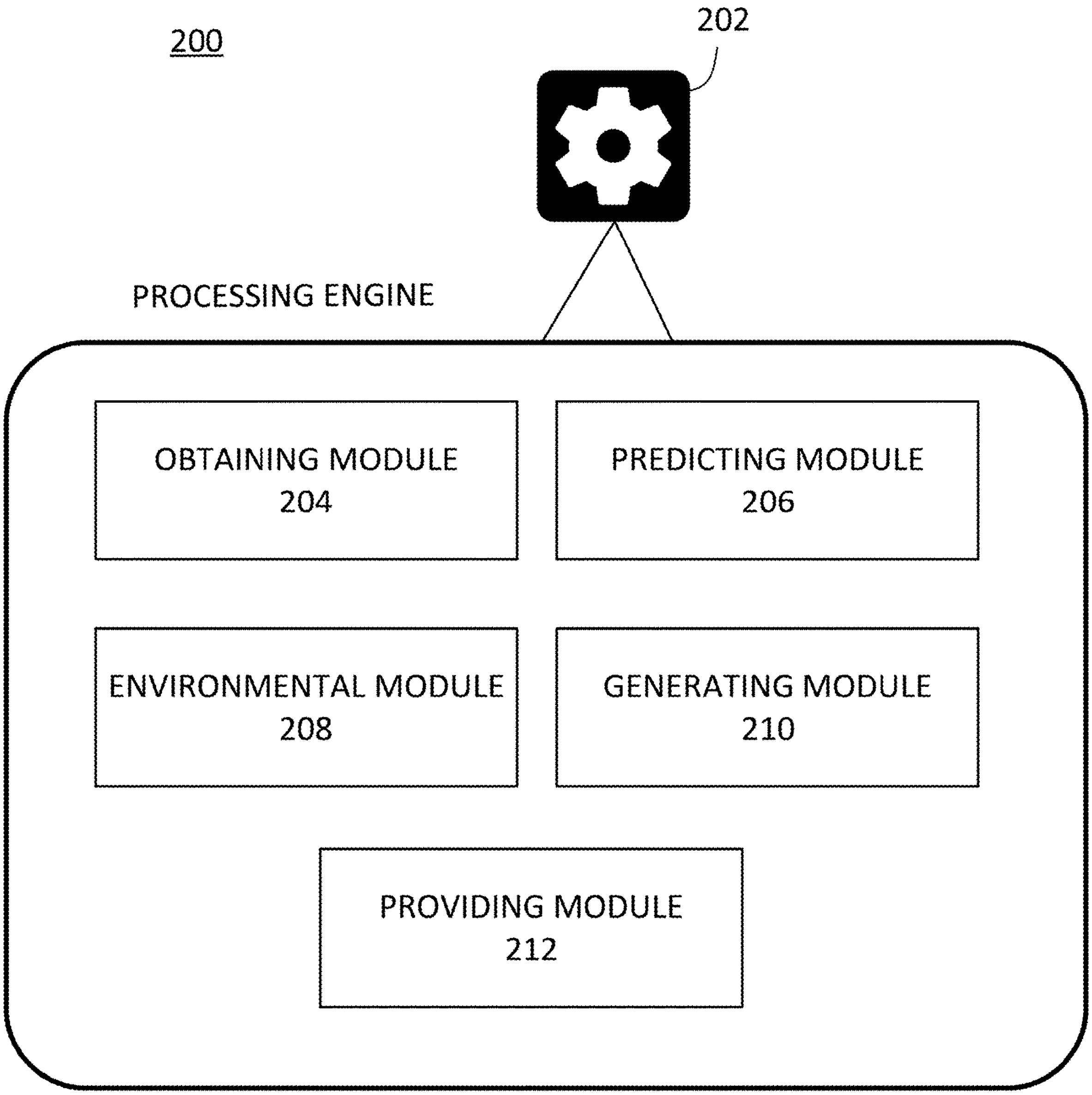
FIG. 2 is a diagram illustrating an exemplary computer system that may execute instructions to perform some of the methods herein.

In an embodiment, the processing engine 102 may perform the exemplary method of FIG. 2 or other method herein and, as a result, provide real-time tracking and navigation for an object in an environment. In some embodiments, this may be accomplished via communication with the client device, processing engine, platform, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

FIG. 2 is a diagram illustrating an exemplary computer system that may execute instructions to perform some of the methods herein. An exemplary computer system 200 is shown with software modules that may execute some of the functionality described herein. In some embodiments, the modules illustrated are components of the processing engine 202.

Obtaining module 204 functions to obtain sensor data from one or more sensor data streams.

Predicting module 206 functions to predict, via an inertial tracking model, a trajectory of an object in an environment in a continuous fashion using the sensor data.

Environmental module 208 functions to retrieve environmental data consisting of a number of environmental constraints relating to the environment.

Generating module 210 functions to generate, via an RL agent, a number of corrections to the trajectory of the object based on the environmental constraints within the environmental data.

Providing module 212 functions to provide real-time tracking and navigation of the object in the environment based on the continuously predicted trajectory and the corrections to the predicted trajectory.

Such functions will be described in further detail below.

Figure 3:
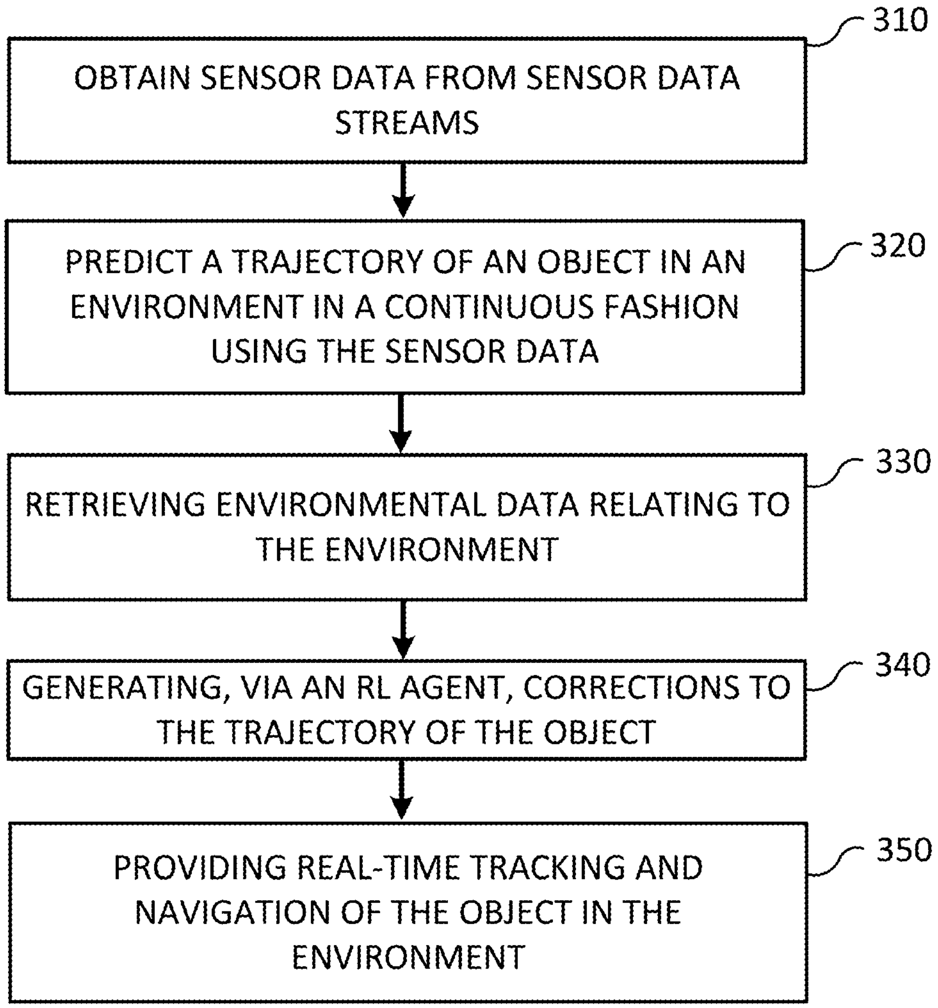
FIG. 3 is a flow chart illustrating an exemplary method that may be performed in some embodiments.

FIG. 3 is a flow chart illustrating an exemplary method that may be performed in some embodiments.

At step 310, the system obtains sensor data from one or more sensor data streams. In some embodiments, this initial step includes the system collecting data from various sensors, such as IMUs, that provide information about the object's motion and the environment in which it operates.

To obtain sensor data, the method utilizes one or more sensor data streams. In some embodiments, sensor data streams as used herein refers to continuous flows of data generated by various sensors capturing measurements related to an object's motion and the surrounding environment. These streams typically consist of, e.g., time-stamped data points representing different sensor readings over time. In some embodiments, sensor data streams can include data from inertial measurement units (IMUs) like accelerometers and gyroscopes, as well as other sensors such as magnetometers, barometers, or external sensors like wireless access points and Bluetooth beacons. By obtaining and processing data from these sensor data streams, the method can gather essential information about, e.g., the object's acceleration, angular velocity, orientation, and other relevant environmental factors. In some embodiments, the sensor data streams can include, for example, IMU data, such as accelerometer and gyroscope readings. These sensors may be commonly found in modern devices such as smartphones. In some embodiments, the sensors are configured to provide measurements related to the object's acceleration, angular velocity, and/or orientation. By capturing data from IMUs, the method gathers information about the object's motion, enabling trajectory prediction and tracking to occur in later steps, as described below.

In some embodiments, the use of the one or more sensor data streams includes incorporating data from multiple sensors simultaneously. This can include additional sensors beyond IMUs, such as, e.g., magnetometers, barometers, wireless access points, and Bluetooth beacons.

At step 320, the system predicts, via an inertial tracking model, a trajectory of an object in an environment in a continuous fashion using the sensor data. The system employs an inertial tracking model that utilizes the sensor data obtained from the previous step 310. In some embodiments, the sensor data, which includes measurements from various sensors, provides information about the object's motion, including, e.g., acceleration, angular velocity, and/or orientation.

In some embodiments, by leveraging the sensor data in a continuous fashion, the inertial tracking model predicts the object's trajectory over time, providing a representation of its position and movement throughout the environment. The continuous nature of the trajectory prediction can allow for real-time tracking of the object. In some embodiments, this enables timely updates and adjustments as the object moves in the environment.

In various embodiments, the inertial tracking model may employ various techniques, such as combining and/or integrating data from multiple sensors, compensating for the limitations and errors of individual sensors and providing a more comprehensive understanding of the object's motion. This can enable the inertial tracking model to generate more accurate and reliable predictions of the object's trajectory.

The predicted trajectory is continuously updated based on the incoming sensor data. In some embodiments, this ensures that the tracking remains responsive to changes in the object's motion and environment. This continuous trajectory prediction is essential for applications that require real-time tracking and monitoring, such as, e.g., robotics, autonomous vehicles, or weapons systems.

At step 330, the system retrieves environmental data including a number of environmental constraints relating to the environment. In some embodiments, to retrieve this environmental data, the method accesses a database or a collection of information that contains a variety of environmental constraints. These constraints can include physical obstacles, boundaries, legal limitations, structural features, or any other relevant factors present in the environment where the object is operating.

In some embodiments, the environmental data is obtained to provide contextual information and constraints that influence the object's trajectory. Examples of environmental data can include, e.g., floor maps, architectural blueprints, building layouts, occupancy information, or any other data sources that provide details about the environment. By retrieving this environmental data, the system can incorporate these constraints into the trajectory prediction and tracking process. These constraints may serve as guidelines and/or boundaries for the object's motion, ensuring that the predicted trajectory remains within the desired limits and adheres to the specific constraints set by the environment.

In some embodiments, the environmental data retrieval process may involve preprocessing and analyzing the available data to extract relevant constraints. In various embodiments, this may include one or more techniques such as, e.g., image processing, computer vision algorithms, or pattern recognition methods to identify and extract information from environmental data sources.

In various embodiments, the environmental data may include one or more of: floor plans, road maps, wireless access point map data, Bluetooth beacons, satellite images, global positioning system (GPS) data, or surveillance camera coverage. In some embodiments, floor plans may provide a detailed representation of the layout and structure of the environment, including the positions of, e.g., walls, doors, or other architectural features. In some embodiments, road maps may provide environmental data relating to, e.g., road networks, intersections, and traffic regulations. In some embodiments, wireless access point map data may include information about the location and signal strength of wireless access points in the environment. By utilizing this data, the method can perform wireless localization or fingerprinting, enhancing the tracking and navigation capabilities of the system, particularly in indoor environments where GPS signals may be limited. In some embodiments, Bluetooth beacons may transmit signals and can be placed strategically in the environment. By leveraging Bluetooth beacon data, the method can perform beacon-based localization, enabling precise tracking and navigation in areas where GPS or wireless signals are unreliable or unavailable. In some embodiments, satellite images may provide aerial environmental data. In some embodiments, GPS data may leverage the signals from GPS satellites to estimate the object's position with respect to Earth's coordinates, providing accurate outdoor tracking and navigation capabilities. In some embodiments, surveillance camera footage may include one or more video feeds from surveillance cameras deployed in the environment.

At step 340, the system generates, via an RL agent, a plurality of corrections to the trajectory of the object based on the environmental constraints within the environmental data.

To generate corrections, the method employs an RL agent, which is a computational model that interacts with the environment and learns from its actions to optimize its behavior over time. This process involves reinforcement learning. In some embodiments, the RL agent utilizes the environmental data, which includes a variety of environmental constraints, as inputs to inform its decision-making process.

In some embodiments, the RL agent learns from the environmental data and uses it to generate a plurality of corrections to the predicted trajectory of the object. These corrections aim to refine and adjust the trajectory such that it adheres to the specified environmental constraints. In various embodiments, the corrections can involve adjustments in, e.g., position, orientation, speed, and/or any other relevant parameters of the object's trajectory. By leveraging reinforcement learning techniques, the method enables the RL agent to iteratively improve its ability to generate accurate corrections based on the environmental constraints. In some embodiments, the RL agent learns from the interactions between the object and the environment, continuously updating its policy to optimize the trajectory predictions in a way that satisfies the given constraints.

In some embodiments, the environmental constraints within the environmental data serve as feedback signals for the RL agent. The RL agent evaluates the predicted trajectory against these constraints and adjusts its correction generation accordingly. Through this iterative process, the RL agent aims to refine the trajectory to ensure compliance with the environment's limitations and requirements.

In some embodiments, generating the corrections involves utilizing a Floormap Fusion Model to re-frame correction of the predicted trajectory as a Markov Decision Process (hereinafter "MDP"). In some embodiments, the Floormap Fusion Model refers to a computational model that integrates various environmental constraints and sensor data to refine and adjust the predicted trajectory of the object. By re-framing the correction process as an MDP, the Floormap Fusion Model leverages the principles of decision-making under uncertainty. In some embodiments, the system models the trajectory correction problem as a sequence of multiple decision points, where the correction at each point is based on the current state, the available environmental constraints, and the desired trajectory outcome. In some embodiments, the model takes into account the probabilities of transitioning between different states and the associated rewards or penalties for making specific corrections.

In some embodiments, the Floormap Fusion Model employs one or more graph optimization techniques to extract environmental features from the environmental data. In some embodiments, graph optimization techniques may be used to optimize or refine solutions based on graph structures. In the context of the Floormap Fusion Model, these techniques are applied to extract meaningful environmental features from the available environmental data sources. In some embodiments, by representing the environment as a graph, where nodes represent locations or features, and edges represent relationships or connections between them, the Floormap Fusion Model can be used to apply graph optimization techniques to extract relevant features from this data. In some embodiments, the graph optimization techniques employed by the Floormap Fusion Model analyze the connectivity and relationships between nodes in the graph, identifying, e.g., important landmarks, regions of interest, or spatial patterns that can contribute to the trajectory corrections. These techniques can include, for example, graph clustering, graph matching, shortest path algorithms, or any other graph-based optimization methods.

In some embodiments, the system trains the RL agent to perform corrections for scaling errors and orientation errors within specified trajectory segments within the predicted trajectory. Scaling errors refer to inaccuracies or deviations in the scale or size of the predicted trajectory compared to the actual environment. Orientation errors, on the other hand, pertain to deviations in the rotational alignment or orientation of the predicted trajectory with respect to the actual orientation in the environment. In some embodiments, the RL agent is specifically trained to identify and rectify scaling and orientation errors within specified trajectory segments.

In some embodiments, during the training phase, the RL agent is exposed to a set of training data that includes examples of scaling and orientation errors in trajectory segments. The RL agent may learn to recognize the patterns and characteristics of these errors, and may develop a policy or set of rules to determine appropriate corrective actions. In some embodiments, the training process involves iterations where the RL agent receives feedback on its actions and adjusts its decision-making process accordingly. Through this iterative training, the RL agent improves its ability to detect and correct scaling and orientation errors, refining its performance over time. In some embodiments, once trained, the RL agent is capable of autonomously identifying trajectory segments that exhibit scaling or orientation errors and applying appropriate corrections based on the environmental constraints.

In some embodiments, generating the corrections includes performing, via the RL agent, elimination of a number of contradictions between the trajectory and physical obstructions from the environmental data. In some embodiments, the predicted trajectory of the object is continuously compared with the environmental data, which includes information about physical obstructions such as, e.g., walls, furniture, or other objects present in the environment. These physical obstructions can pose challenges to accurate trajectory estimation. The RL agent is thus trained to identify contradictions between the predicted trajectory and the physical obstructions detected from the environmental data. Contradictions can arise when the predicted trajectory suggests a path that intersects or collides with these obstructions. To address these contradictions, the RL agent takes corrective actions to eliminate or minimize them. The agent leverages its learned policy or set of rules to modify the predicted trajectory, adjusting its path to avoid the detected physical obstructions. In some embodiments, the RL agent's decision-making process takes into account the environmental constraints and the object's real-time sensor data to determine the optimal corrections. It analyzes the trajectory, identifies potential conflicts, and applies suitable adjustments to ensure the object navigates safely and accurately through the environment.

In some embodiments, the RL agent utilizes a Double Deep Q-Network (hereinafter "DDQN") architecture for generating trajectory corrections. A DDQN architecture refers to a type of neural network architecture typically employed in reinforcement learning tasks. In some embodiments, the DDQN architecture enhances the agent's ability to make informed decisions and optimize the trajectory corrections. In some embodiments, the DDQN architecture consists of multiple layers of artificial neurons that process the input data, which includes, e.g., the continuously predicted trajectory, environmental constraints, and other relevant information. In some embodiments, these layers enable the RL agent to learn complex patterns and relationships between the input data and the desired trajectory corrections. By leveraging the DDQN architecture, the RL agent can effectively approximate the optimal trajectory corrections by iteratively learning and updating its Q-values, which represent the expected rewards for different actions in different states. This allows the RL agent to make informed decisions on the adjustments needed to refine the predicted trajectory.

In some embodiments, the RL agent is trained using a simulated environment that incorporates physics-based constraints. By incorporating physics-based constraints into the simulation, the RL agent can learn to navigate and interact with the environment in a realistic and dynamic manner. This may allow the RL agent to develop an understanding of how different physical factors, such as, e.g., gravity, collisions, and object dynamics, impact the trajectory of the object being tracked. In some embodiments, the simulated environment used for training encompasses a virtual representation of the real-world environment where the system will eventually operate. In some embodiments, the simulated environment includes accurate modeling of the physical properties and constraints relevant to the tracking and navigation task. For example, this could involve simulating the behavior of, e.g., objects, surfaces, obstacles, and other environmental factors that influence the trajectory of the object. In some embodiments, during the training process, the RL agent interacts with the simulated environment, receiving feedback on its actions and adjusting its policy based on the rewards and penalties received. By repeatedly exploring and learning from the simulated environment, the RL agent can gradually improve its ability to generate accurate trajectory corrections.

In some embodiments, the RL agent dynamically adjusts the trajectory corrections based on real-time sensor data and environmental changes. Real-time sensor data refers to the continuous stream of information captured by various sensors. This data provides ongoing feedback about the object's movement, orientation, and environmental conditions. Environmental changes encompass any modifications or updates in the surroundings, such as, e.g., the presence of obstacles, alterations in the floor plan, or changes in the wireless signal strength. In some embodiments, the RL agent within the system leverages the real-time sensor data and environmental changes to adapt its trajectory corrections. By continuously monitoring and analyzing the incoming sensor data, the agent can assess the accuracy and alignment of the predicted trajectory with the actual object's movement. In some embodiments, when environmental changes occur, such as the introduction of new obstacles or modifications in the floor plan, the RL agent takes these changes into account and adjusts the trajectory corrections accordingly. Furthermore, the RL agent's ability to dynamically adjust trajectory corrections enables it to respond to unexpected or sudden changes in the environment. For example, if a previously clear path becomes obstructed, the agent can detect the change through the sensor data and promptly generate corrections to navigate around the newly introduced obstacle. In some embodiments, the dynamic adjustment of trajectory corrections is achieved through the RL agent's learned policy and decision-making process. The agent continuously evaluates the sensor data and environmental changes, comparing them to the predicted trajectory, and generates appropriate corrections in real-time.

In some embodiments, the RL-based solution operates with a negligible delay in trajectory correction effectiveness, based on the frequency of observed contradictions. Contradictions refer herein to inconsistencies or conflicts between the predicted trajectory and the real-world environment. These contradictions may arise due to various factors, such as, e.g., inaccuracies in the sensor data, unexpected obstacles, or changes in environmental conditions. In some embodiments, the RL-based solution is trained to minimize these contradictions by continuously adjusting the trajectory corrections. The negligible delay in trajectory correction effectiveness indicates the system's ability to maintain a high level of synchronization between the predicted trajectory and the actual movement of the object. This capability may be critical for some use cases and applications that require precise tracking and navigation, where even small delays can lead to significant deviations from the intended path.

In some embodiments, the RL agent generates trajectory corrections to optimize the object's movement in accordance with one or more predefined objectives. In various embodiments, such objectives may include one or more of: minimizing travel time, maximizing energy efficiency, or prioritizing safety considerations. The RL agent, through its training and learning process, is designed to improve or correct the object's movement within the environment. By incorporating predefined objectives, the agent may prioritize specific factors that align with the user's requirements or system constraints.

At step 350, the system provides real-time tracking and navigation of the object in the environment based on the continuously predicted trajectory and the corrections to the predicted trajectory.

In some embodiments, real-time tracking enables the continuous real-time monitoring of an object's position and movement within the environment. For example, in the context of a delivery service, the method can be used to track the location of packages or vehicles in transit. By continuously predicting the trajectory and incorporating corrections, the method ensures accurate real-time tracking of the objects, enabling efficient logistics management, route optimization, and timely updates on package status.

In an example use case of tracking security personnel, the method can be applied to monitor and track the movements of security personnel within a designated area, such as a building or a high-security facility. By utilizing the continuously predicted trajectory, the method can provide real-time updates on the current position and movement of the personnel. In various embodiments, the corrections to the predicted trajectory, generated based on environmental constraints, ensure that the personnel adhere to predefined routes, restricted areas, or other specified rules.

With respect to real-time navigation, the method can facilitate the guidance and routing of objects or individuals within the environment. For example, in a mobile mapping application, the method can provide turn-by-turn navigation instructions to users, guiding them through a complex road network. The continuously predicted trajectory, combined with the corrections based on environmental constraints, helps calculate the optimal route in real-time, considering factors such as, e.g., traffic conditions, road closures, or user preferences. This enhances user experience, improves navigation efficiency, and assists in reaching destinations accurately and promptly.

In an example use case of navigation within an airport, the method can assist individuals in finding their way through the complex layout of an airport. The continuously predicted trajectory serves as a navigation guide, providing real-time updates on the optimal path and directions to reach specific destinations, such as, e.g., terminals, gates, or amenities. The corrections to the predicted trajectory, incorporating environmental constraints specific to the airport, help individuals navigate efficiently, taking into account factors such as, e.g., security checkpoints, restricted areas, or even time-sensitive constraints like flight departure times. This improves the overall airport experience by reducing confusion, minimizing delays, and optimizing navigation within the airport environment.

In some embodiments, the real-time aspect of the method allows for applications that require instant updates and responsiveness. For example, in emergency response scenarios, such as, e.g., firefighting or search-and-rescue operations, the method can enable real-time tracking and navigation of personnel or unmanned vehicles within hazardous environments.

Moreover, the combination of real-time tracking and navigation capabilities may be employed in example use cases such as, e.g., fleet management or ride-hailing services. In various embodiments, the method can support efficient monitoring of, e.g., vehicle locations, dispatching, and/or route optimization, providing real-time information to users and operators alike. This enhances operational efficiency, reduces waiting times, and improves overall service quality.

In some embodiments, providing real-time tracking and navigation of the object includes multi-floor tracking of the object, wherein the continuously predicted trajectory and the corrections are matched with multi-floor environmental data to determine the object's proximity to one or more points of interest across a plurality of floors in the environment. In this case, the continuously predicted trajectory and the corrections are not only used for tracking and navigation but also for determining the object's proximity to various points of interest across multiple floors in the environment. In some embodiments, the system incorporates multi-floor tracking by leveraging the continuously predicted trajectory and the corrections. By matching this trajectory data with multi-floor environmental data, the method gains the ability to determine the object's proximity to points of interest across different floors in the environment.

For example, in a large-scale shopping mall encompassing multiple floors, the system can detect the object's proximity to specific points of interest spread out across the multiple floors, such as, e.g., popular stores, restaurants, restrooms, or emergency exits. By analyzing the continuously predicted trajectory and comparing it with the multi-floor environmental data, the method can determine if the object is close to these points of interest on various floors, thereby providing the user with real-time notifications or guidance. This can enable users to seamlessly move between floors while receiving accurate and contextual information about the surrounding points of interest based on their proximity.

In some embodiments, the system receives one or more new pieces of sensor data, and for each new piece of sensor data that is received, updates one or more of: the continuously predicted trajectory of the object, one or more previously predicted trajectories of the object, and one or more previous corrections to the trajectory of the object. In some embodiments, the new sensor data may be obtained from the same or different sensor data streams as before, such as tri-axial accelerometer, gyroscope, magnetometer, camera, audio, or barometer data. In some embodiments, upon receiving new sensor data, the method initiates an update process to ensure that the predicted trajectory of the object, as well as any previously predicted trajectories and corrections, remain accurate and up to date. The new sensor data is integrated into the existing system, and the system uses this information to refine the trajectory predictions and any associated corrections. By incorporating the latest sensor data, the method can adapt to changes in the object's motion or environmental conditions, enabling more precise tracking and navigation. In some embodiments, the update process may involve recalculating the predicted trajectory based on the newly acquired data, adjusting the previously predicted trajectories to align with the updated information, and/or refining the previous corrections based on the latest sensor inputs.

In some embodiments, providing the real-time tracking and navigation of the object includes providing one or more real-time notifications related to one or more of: points of interest, environmental changes, or potential hazards in the environment. In some embodiments, these notifications may serve to inform the user or operator about relevant information that can aid in navigation, safety, and decision-making. The notifications are generated based on the continuously updated trajectory and the environmental data. In some embodiments, the real-time notifications are generated based on the continuously predicted trajectory and the environmental constraints obtained from the sensor data and environmental data sources.

Figure 4:
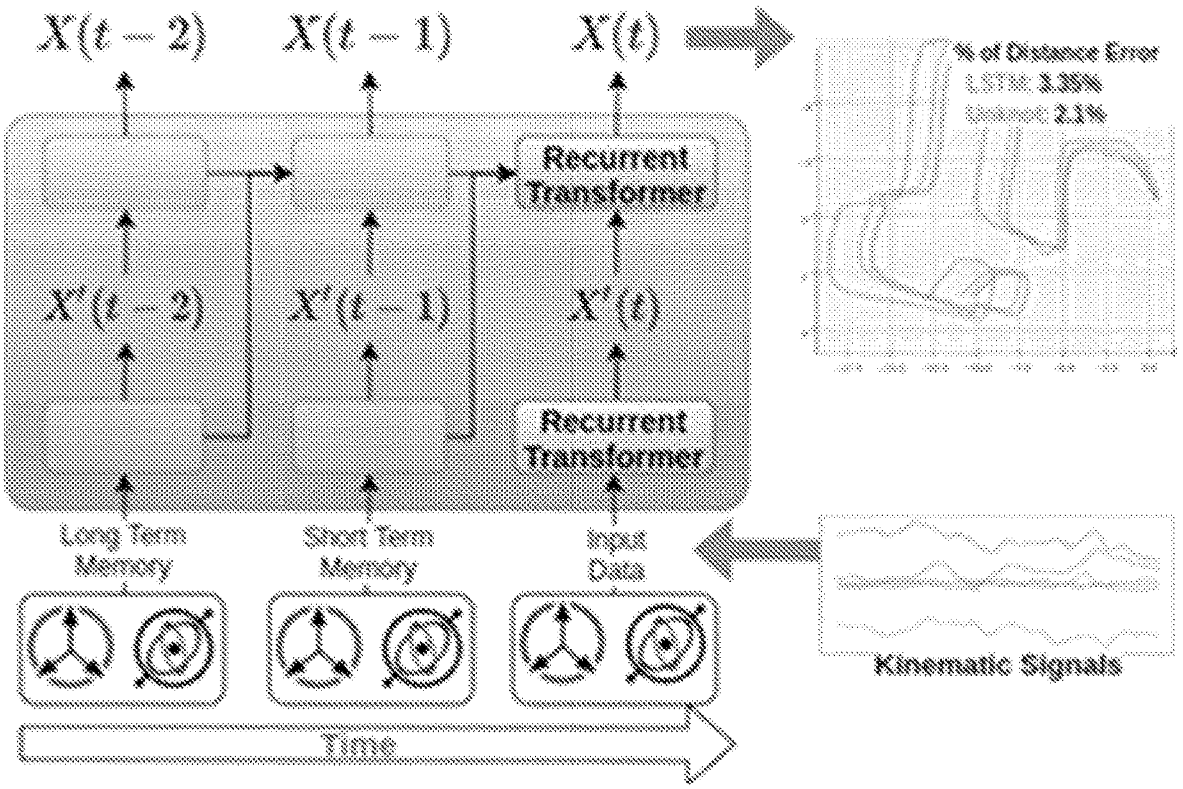
FIG. 4 is a diagram illustrating an inertial tracking model, in accordance with some of the embodiments herein.

FIG. 4 is a diagram illustrating an inertial tracking model, in accordance with some of the embodiments herein. In the example diagram, the system utilizes a recurrent transformer architecture with long-term memory.

Trajectories predicted using only inputs from accelerometer and gyroscope data streams contain an irreducible error. The dominant source of this error is rotational drift from the gyroscope, and since IMU measurements are local in nature, the error is irreducible in the absence of any feedback from the environment that can be used for error correction. Within the IMU itself there are sources of feedback that can correct for this drift, the accelerometer and the magnetometer, which are also local. The accelerometer makes it trivial to correct for errors in the vertical direction of the gyroscope by measuring the direction of gravity, thus largely eliminating drift errors along this axis. The magnetometer functions as a means for reducing drift errors on the two-dimensional plane of navigation, but these methods struggle in complex magnetic field environments such as indoor spaces where this noise obscures the Earth's true north.

Other sensors such as barometer, visual and audio can be added to inertial sensors to enhance the prediction accuracy. The predicted trajectory is then used by an RL agent for corrections, as will be described further in FIG. 5.

Figure 5:
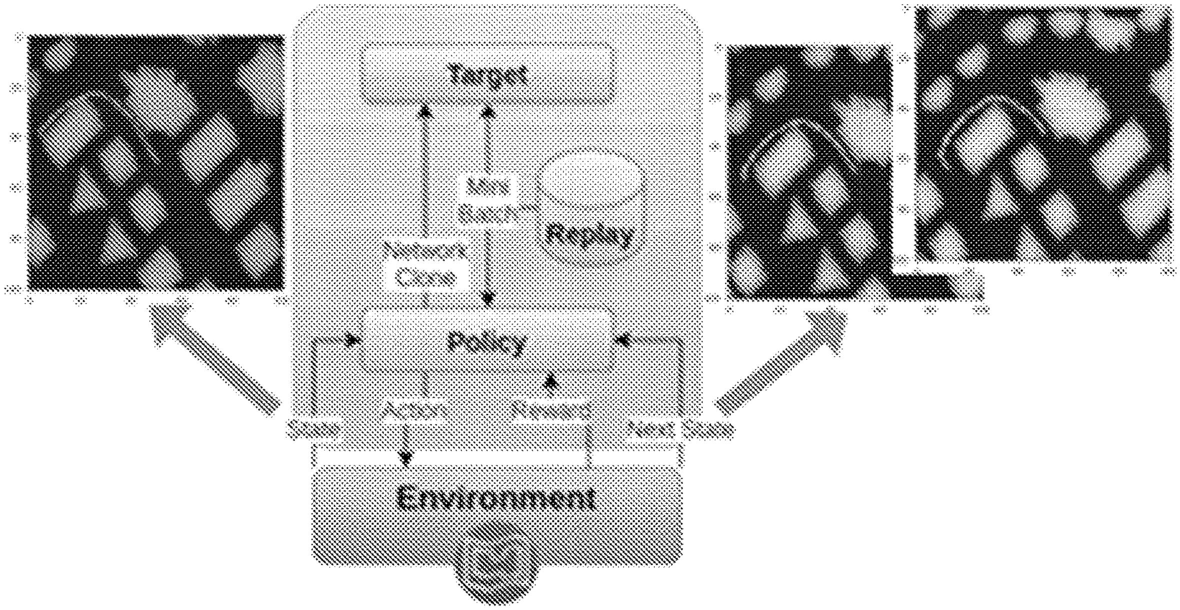
FIG. 5 is a diagram illustrating a reinforcement learning agent, in accordance with some embodiments herein.

FIG. 5 is a diagram illustrating an RL agent, in accordance with some embodiments herein. In the example diagram, the RL agent is configured with a design that follows a standard DDQN architecture. In this framework, the agent is placed at a certain point on the trajectory and is given access to a state that contains a representation of the agent's "local" environments, which consists of a limited window of the floor map with the agent at the origin. The agent also has access to a context window of the future trajectory, which acts as an oracle that informs the agent of what the future position will be in the absence of any future actions. The agent is tasked with generating a minimal action that will resolve any seen contradictions before moving on to the next step in the trajectory.

Figure 6:
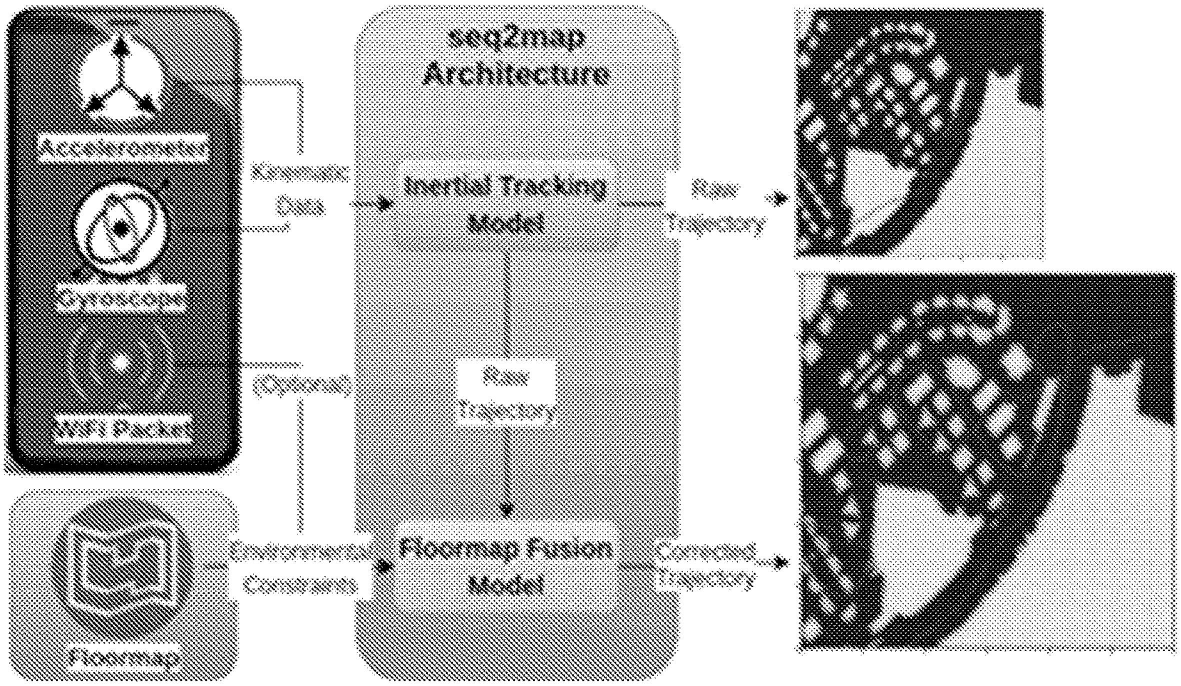
FIG. 6 is a diagram illustrating how the components discussed herein connect with one another, in accordance with some embodiments herein.

FIG. 6 is a diagram illustrating how the components discussed herein connect with one another, in accordance with some embodiments herein. Sensor data, including, e.g., accelerometer, gyroscope, and wireless packet data, is used as input for an inertial tracking model, which continuously predicts a raw trajectory of an object within an environment. Environmental data, such as a floormap, includes environmental constraints which are used as input for a floormap fusion model which generates a number of corrected trajectories in real time. This enables real-time tracking and navigation of the object within the environment, as described in further detail above.

Figure 7:
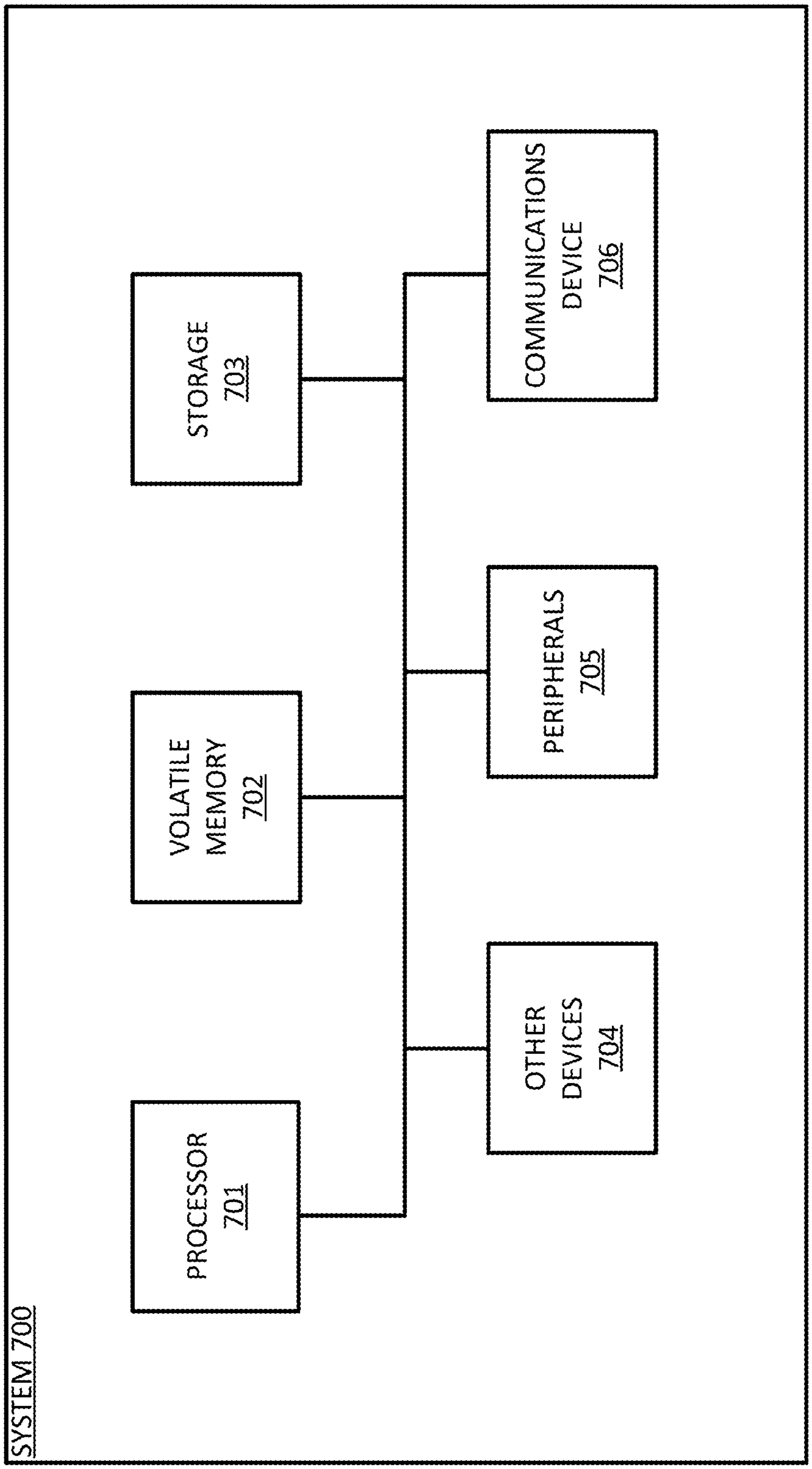
FIG. 7 is a diagram illustrating an exemplary computer that may perform processing in some embodiments.

FIG. 7 is a diagram illustrating an exemplary computer that may perform processing in some embodiments. Exemplary computer 700 may perform operations consistent with some embodiments. The architecture of computer 700 is exemplary. Computers can be implemented in a variety of other ways. A wide variety of computers can be used in accordance with the embodiments herein.

Processor 701 may perform computing functions such as running computer programs. The volatile memory 702 may provide temporary storage of data for the processor 701. RAM is one kind of volatile memory. Volatile memory typically requires power to maintain its stored information. Storage 703 provides computer storage for data, instructions, and/or arbitrary information. Non-volatile memory, which can preserve data even when not powered and including disks and flash memory, is an example of storage. Storage 703 may be organized as a file system, database, or in other ways. Data, instructions, and information may be loaded from storage 703 into volatile memory 702 for processing by the processor 701.

The computer 700 may include peripherals 705. Peripherals 705 may include input peripherals such as a keyboard, mouse, trackball, video camera, microphone, and other input devices. Peripherals 705 may also include output devices such as a display. Peripherals 705 may include removable media devices such as CD-R and DVD-R recorders/players. Communications device 706 may connect the computer 100 to an external medium. For example, communications device 706 may take the form of a network adapter that provides communications to a network. A computer 700 may also include a variety of other devices 704. The various components of the computer 700 may be connected by a connection medium such as a bus, crossbar, or network.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method for predicting and constraining kinematic trajectories in an environment, the method including steps comprising:

i) obtaining sensor data from one or more sensor data streams;

ii) predicting, via an inertial tracking model, a trajectory of an individual person in an environment using the sensor data, wherein the individual person is capable of decision making that changes the trajectory iii) retrieving environmental data comprising a plurality of environmental constraints including at least legal limitations and one more of physical obstacles, boundaries, or structural features in the environment;

iv) generating, via a reinforcement learning (RL) agent, a plurality of corrections to the trajectory of the individual person based on the environmental constraints within the environmental data;

v) repeating steps i) through iv) in real-time to generate a report including tracking and navigation information of the individual person in the environment using the trajectory and the plurality of corrections; and vi) providing the report to a plurality of security personnel for navigation around the environment based on the trajectory of the individual person.

2. The method of claim 1, wherein providing real-time tracking and navigation of the individual person comprises multi-floor tracking of the individual person wherein the trajectory and the corrections are matched with multi-floor environmental data to determine the individual person's proximity to one or more points of interest across a plurality of floors in the environment.

3. The method of claim 1, wherein the sensor data streams comprise data captured from one or more of: tri-axial accelerometer, gyroscope, magnetometer, camera, audio, or barometer data.

4. The method of claim 1, wherein the environmental data comprises one or more of: floor plans, road maps, wireless access point map data, Bluetooth beacons, satellite images, global positioning system (GPS) data, or surveillance camera coverage.

5. The method of claim 1, wherein generating the corrections comprises:

utilizing a Floormap Fusion Model to re-frame correction of the trajectory as a Markov Decision Process (MDP).

6. The method of claim 5, wherein the Floormap Fusion Model employs one or more graph optimization techniques to extract environmental features from the environmental data.

7. The method of claim 1, further comprising:

training the RL agent to perform corrections for scaling errors and orientation errors within specified trajectory segments within the trajectory.

8. The method of claim 1, wherein generating the corrections comprises:

performing, via the RL agent, elimination of a plurality of contradictions between the trajectory and physical obstructions from the environmental data.

9. The method of claim 1, further comprising:

receiving one or more new pieces of sensor data; and for each new piece of sensor data that is received, updating one or more of: the trajectory of the individual person, one or more previously predicted trajectories of the individual person, and one or more previous corrections to the trajectory of the individual person.

10. A system comprising one or more processors configured to perform operations of:

obtaining sensor data from one or more sensor data streams;

predicting, via an inertial tracking model, a trajectory of an individual person in an environment in a continuous fashion using the sensor data, wherein the individual person is capable of decision making that changes the trajectory;

retrieving environmental data comprising a plurality of environmental constraints including at least legal limitations and one more of physical obstacles, boundaries, or structural features in the environment;

generating, via a reinforcement learning (RL) agent, a plurality of corrections to the trajectory of the individual person based on the environmental constraints within the environmental data;

generating a report including real-time tracking and navigation of the individual person in the environment based on the trajectory and the corrections to the trajectory; and providing the report to an airport staff member for navigation around the airport based on the trajectory of the individual person.

11. The system of claim 10, wherein the RL agent utilizes a Double Deep Q-Network (DDQN) architecture for generating trajectory corrections.

12. The system of claim 10, wherein the RL agent is trained using a simulated environment that incorporates physics-based constraints.

13. The system of claim 10, wherein the RL agent, learns a policy for scaling errors correction by analyzing a relationship between trajectory segments and the environment.

14. The system of claim 10, wherein the RL agent learns a policy for orientation errors correction by analyzing rotational drift patterns from gyroscopic data.

15. The system of claim 10, wherein the RL agent dynamically adjusts the trajectory corrections based on real-time sensor data and environmental changes.

16. The system of claim 10, wherein the RL agent operates with a negligible delay in trajectory correction effectiveness, based on a frequency of observed contradictions.

17. The system of claim 10, wherein the environmental constraints within the environmental data comprise information about a presence and location of obstacles, and wherein one or more of the corrections to the trajectory relate to adjusting the trajectory of the individual person to avoid collisions with the obstacles.

18. The system of claim 10, wherein providing the real-time tracking and navigation of the individual person comprises providing one or more real-time notifications related to one or more of: points of interest, environmental changes, or potential hazards in the environment.

19. The system of claim 10, wherein the RL agent generates trajectory corrections to optimize the individual person's movement in accordance with one or more predefined objectives.

20. A non-transitory computer-readable medium storing instructions that, when executed by one or more processors, cause the one or more processors to:

obtain sensor data from one or more sensor data streams;

predict, via an inertial tracking model, a trajectory of an individual person in an environment in a continuous fashion using the sensor data, wherein the individual person is capable of decision making that changes the trajectory;

retrieve environmental data comprising a plurality of environmental constraints including at least legal limitations and one more of physical obstacles, boundaries, or structural features in the environment;

generate via a reinforcement learning (RL) agent, a plurality of corrections to the trajectory of the individual person based on the environmental constraints within the environmental data;

generate a report including real-time tracking and navigation of the individual person in the environment based on the trajectory and the corrections to the trajectory; and provide the report to a plurality of security personnel for navigation around the environment based on the predicted trajectory of the individual person.

* * * * *